March 10, 1925.
C. A. ROWLEY
1,529,278
SHEET GLASS DRAWING APPARATUS
Filed Feb. 18, 1924
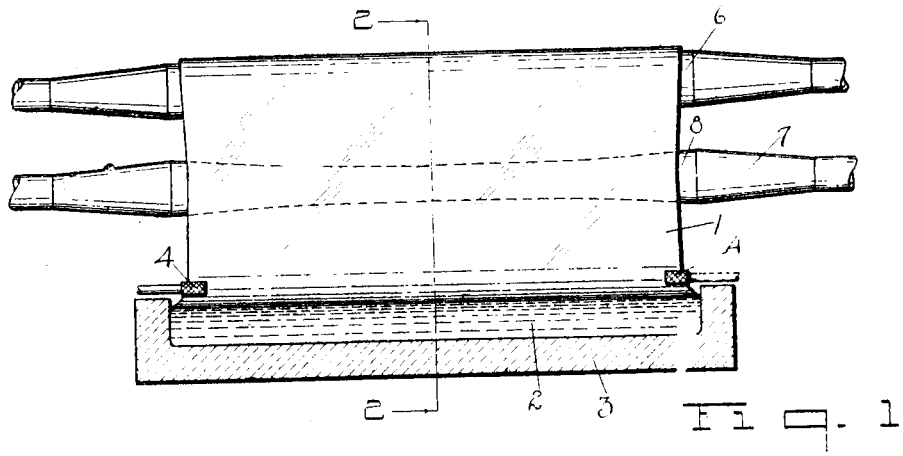
Fig. 1
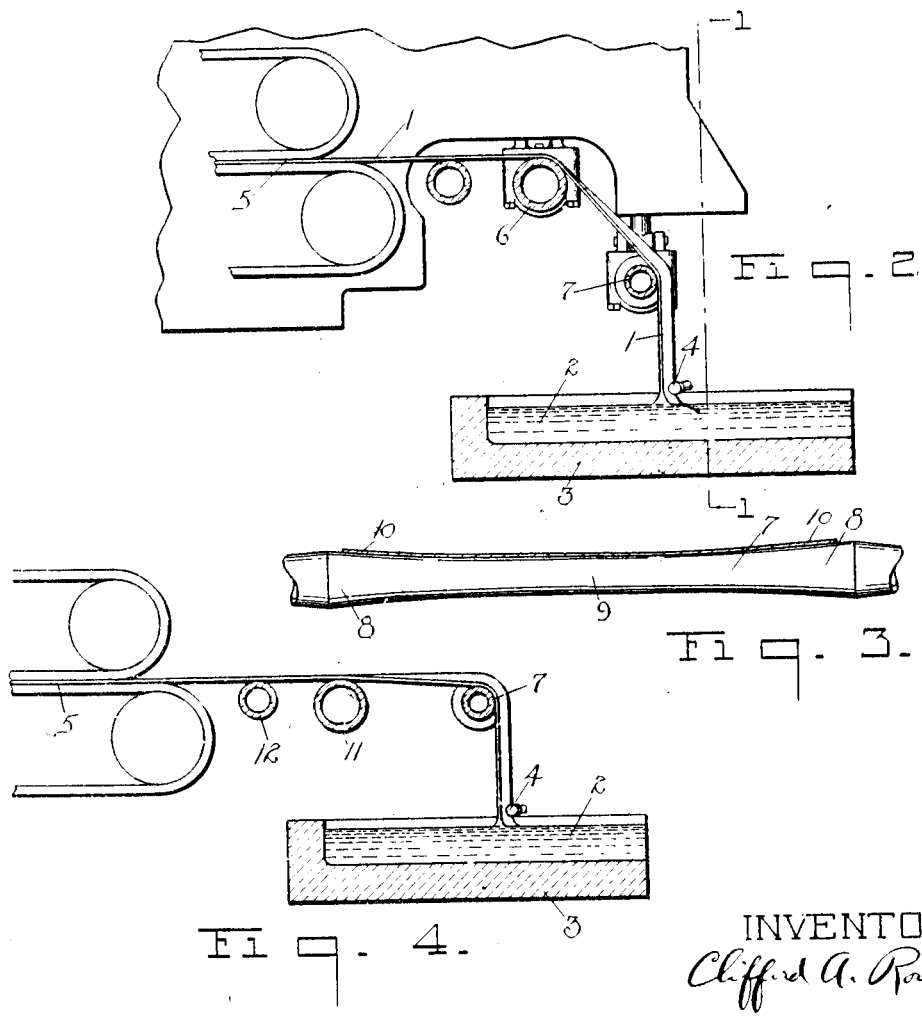
Fig. 2
Fig. 3.
Fig. 4.
INVENTOR.
Clifford A. Rowley Patented Mar. 10, 1925.

1,529,278

UNITED STATES PATENT OFFICE.

CLIFFORD A. ROWLEY, OF TOLEDO, OHIO, ASSIGNOR TO LIBBEY-OWENS SHEET GLASS COMPANY, OF TOLEDO, OHIO, A CORPORATION OF OHIO.

SHEET-GLASS-DRAWING APPARATUS.

Application filed February 18, 1924. Serial No. 693,534.

*To all whom it may concern:*

Be it known that I, CLIFFORD A. ROWLEY, a citizen of the United States, residing at Toledo, in the county of Lucas and State of Ohio, have invented new and useful Improvements in Sheet-Glass-Drawing Apparatus, of which the following is a specification.

This invention relates to the art of drawing sheet glass, and more particularly to an improved form of bending member about which the plastic sheet is deflected from one plane into another.

In the system of drawing sheet glass disclosed for example in the patent to Colburn, 1,248,809, granted December 4, 1917, the glass sheet is drawn upwardly from a shallow pool of molten glass and, while still somewhat plastic, is deflected about a cooled bending roller into the horizontal plane, and then drawn through suitable flattening mechanism into the leer.

According to the present invention the bending roller, or one of the bending rollers, about which the sheet is deflected from one plane into another is made of somewhat larger diameter adjacent its ends, about which the edge portions of the glass sheet are bent, than it is at its central portion which carries the main central portion of the sheet. In this way the edge portions of the sheet will have to travel through a somewhat larger arc and will be subjected to a greater drawing strain than the central portion of the sheet, which is of material assistance in maintaining the sheet of even width and thickness at all times. Also the edge portions of the sheet have a tendency to ride up toward the ends of the roller onto the portions of greatest diameter according to the well-known principle of the crowned pulley. This also assists in keeping the sheet to width, helping to overcome the natural tendency of the glass sheet to narrow away when drawn continuously from a molten source.

The invention will be better understood from the following detailed description of certain approved forms of the apparatus.

In the accompanying drawings:

Fig. 1 is a front elevation of the bending mechanism, the view being taken substantially on the line 1—1 of Fig. 2.

Fig. 2 is a longitudinal vertical section through the sheet drawing mechanism, taken substantially on the line 2—2 of Fig. 1.

Fig. 3 is an elevation of the improved bending roller.

Fig. 4 is a view similar to Fig. 2 of a modified form of the apparatus.

The glass sheet 1 is drawn upwardly from the shallow pool of molten glass 2 in receptacle 3. According to the Colburn process this sheet is drawn upwardly between cooled edge drawing rollers indicated at 4, which assist in forming the edge portions of the sheet and keep the sheet to constant width. As in the Colburn system the glass sheet after being bent or deflected about a suitable bending roller is carried away through a drawing and flattening mechanism, indicated generally at 5, and thence passes into the annealing leer, not shown.

In the form of the apparatus shown in Figs. 1 and 2, two bending rollers are used, the upper roller 6 being of the usual cylindrical form and having its upper surface tangent to the plane of the flattening table 5. The other bending roller 7 about which the sheet is first deflected is located somewhat nearer the molten pool 2. As shown more clearly in Figs. 1 and 3, this roller varies in diameter from its central portion to its ends, the end portions 8 being of largest diameter and the central portion 9 of smallest diameter. The sheet supporting surface will have substantially the form of a hyperboloid of revolution, and as viewed from the side the surface of the roller will have a concave appearance extending substantially from end to end of the roller.

It will be noted that, as the plastic glass sheet 1 is deflected about this roller 7 in its travel from the pool to the cylindrical roll 6, the edge portions 10 of the sheet, which are carried by the larger portions 8 of the roller 7, must travel a longer path and will therefore be subjected to a greater tension and stretching force. This will add to the drag or tension in the sheet edges caused by the slowly turning edge-forming rollers 4, and will materially assist in forming the sheet and keeping same to the proper width. For some grades of glass it will be possible to operate without using the rollers 4.

When a belt or other strip of material is bent about a pulley or other rotating supporting member it will tend to ride onto the highest or largest portion of this member, as illustrated by the well-known crown pulley, which prevents the belt from running off at the smaller edges thereof. According to this principle, the edge portions 10 of the sheet will tend to ride up toward the outer and higher portions of the roller 7, and this tendency also materially assists in maintaining the width of the glass sheet.

The dished or curved contour imparted to sheet 1 by its passage over roller 7 will be eliminated and the sheet flattened out by the cylindrical roller 6, so that the sheet will be substantially flat before it reaches the drawing and flattening mechanism 5.

In the modified form of the apparatus shown in Fig. 4, the concaved roller 7 is the only deflecting member used, the sheet being bent at right angles about this roller and passing in the horizontal plane first over suitable intermediate supporting rollers 11 and 12 and thence into the drawing and flattening mechanism 5. The principles of operation are the same, as with the form of the invention shown in Figs. 1 and 2, and already described.

Claims:

1. In apparatus for drawing sheet glass, a roller about which the plastic sheet is deflected from one direction of travel to another, the sheet-carrying surface of the roller having substantially the form of a hyperboloid of revolution.

2. In apparatus for drawing sheet glass, a roller about which the plastic sheet is deflected from one direction of travel to another, the sheet-carrying surface of the roller being concaved inwardly toward the central portion of the roller.

3. In apparatus for drawing sheet glass, a roller about which the plastic sheet is deflected from one direction of travel to another, those portions of the roller which carry the edge portions of the sheet being of different diameter from the portion carrying the central portion of the sheet.

4. In apparatus for drawing sheet glass, a roller about which the plastic sheet is deflected from one direction of travel to another, those portions of the roller which carry the edge portions of the sheet being of larger diameter than the portion which carries the central portion of the sheet.

5. In apparatus for drawing sheet glass, a roller about which the plastic sheet is deflected from one direction of travel to another, the roller having a continuous curved sheet-carrying surface of smaller diameter at the center of the roller than adjacent its ends.

6. In apparatus for drawing a continuous sheet of glass from a pool of molten glass, a bending system for the plastic sheet comprising a plurality of rollers, the one about which the sheet is first deflected having a sheet-carrying surface substantially in the form of a hyperboloid of revolution.

7. In apparatus for drawing a continuous sheet of glass from a pool of molten glass, a bending system for the plastic sheet comprising a plurality of rollers, the one about which the sheet is first deflected having a sheet-carrying surface which is curved longitudinally of the roller.

8. In apparatus for drawing a continuous sheet of glass from a pool of molten glass, a bending system for the plastic sheet comprising a plurality of rollers, the one about which the sheet is first deflected having a continuously curved sheet-carrying surface which is of larger diameter adjacent the ends of the roller than at the central portion thereof.

Signed at Toledo, in the county of Lucas and State of Ohio, this 16th day of February, 1924.

CLIFFORD A. ROWLEY.